US009250441B2

(12) United States Patent
Rossini

(10) Patent No.: US 9,250,441 B2
(45) Date of Patent: Feb. 2, 2016

(54) COMPACT AND ENERGY-EFFICIENT HEAD-UP DISPLAY

(71) Applicant: COMMISSARIAT A L'ENERGIE ATOMIQUE ET AUX ENERGIES ALTERNATIVES, Paris (FR)

(72) Inventor: Umberto Rossini, Coublevie (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/397,394

(22) PCT Filed: Apr. 22, 2013

(86) PCT No.: PCT/FR2013/050881
§ 371 (c)(1),
(2) Date: Oct. 27, 2014

(87) PCT Pub. No.: WO2013/164530
PCT Pub. Date: Nov. 7, 2013

(65) Prior Publication Data
US 2015/0085371 A1    Mar. 26, 2015

(30) Foreign Application Priority Data

Apr. 30, 2012 (FR) ..................... 12 53971

(51) Int. Cl.
*G02B 27/14* (2006.01)
*G02B 27/01* (2006.01)
*G02B 3/00* (2006.01)

(52) U.S. Cl.
CPC .......... *G02B 27/0101* (2013.01); *G02B 3/0006* (2013.01); *G02B 2027/015* (2013.01); *G02B 2027/0123* (2013.01); *G02B 2027/0132* (2013.01)

(58) Field of Classification Search
USPC .................................. 359/630–635
See application file for complete search history.

(56) References Cited

U.S. PATENT DOCUMENTS

| 4,810,056 | A | 3/1989 | Migozzi et al. | |
|---|---|---|---|---|
| 2014/0111865 | A1* | 4/2014 | Kobayashi | G02B 5/003 359/633 |
| 2014/0204465 | A1* | 7/2014 | Yamaguchi | G02B 27/0101 359/633 |
| 2014/0268353 | A1* | 9/2014 | Fujimura | G02B 27/0101 359/630 |

FOREIGN PATENT DOCUMENTS

| EP | 0282397 | 9/1988 |
|---|---|---|
| WO | WO03081320 | 10/2003 |
| WO | WO2013164530 | 11/2013 |

OTHER PUBLICATIONS

EPO, International Search Report for PCT/FR2013/050881, Oct. 11, 2013.
European Patent Office, International Search Report for PCT/FR2013/050881, Oct. 11, 2013. (English translation).

* cited by examiner

*Primary Examiner* — Mohammed Hasan
(74) *Attorney, Agent, or Firm* — Kevin R. Erdman; Brannon Sowers & Cracraft PC

(57) ABSTRACT

The invention relates to a head-up display comprising a group of sub-screens ($24_1, 24_2, \ldots 24_5$) the positions and dimensions of which are defined according to the length of the optical path (D) and the maximum authorized range of movement ($B_1$) in a plane that is perpendicular to the optical path and located at a distance equal to the length of the optical path, such that information projected by the group of sub-screens is seen over the entire authorized movement range.

20 Claims, 4 Drawing Sheets

COMPACT AND ENERGY-EFFICIENT HEAD-UP DISPLAY

CROSS-REFERENCE TO RELATED APPLICATIONS

The present application is a National Stage of PCT International Application Serial Number PCT/FR2013/050881, filed Apr. 22, 2013, which claims priority under 35 U.S.C. §119 of French patent Application Serial Number 12/53971, filed Apr. 30, 2012, the disclosures of which are incorporated by reference herein.

BACKGROUND OF THE INVENTION

1. Field of the Invention

The present invention relates to a compact head-up display having a large exit pupil also sometimes referred to as a head-up viewer, head-up collimator or head-up visualization system. More particularly, the present invention relates to such a display having a decreased power consumption.

2. Description of the Related Art

Head-up displays, also known as HUDs, are augmented reality display systems which enable to integrate visual information on a real scene seen by an observer. In practice, such systems may be placed in a helmet visor, in the cockpit of a plane, or in the interior of a vehicle. They are thus positioned at a short distance from the user's eyes, for example, a few centimeters or tens of centimeters away from them.

FIG. 1 schematically illustrates the operation of such a device.

A beam splitter 10 is placed between the eye of user 12 and a scene to be observed 14. The objects of the scene to be observed are generally located at infinity or at a long distance from the observer. Beam splitter 10 is placed according to a 45° angle relative to the axis between scene 14 and observer 12 to transmit the information originating from scene 14 to observer 12, without altering this information.

To project an image seen at the same distance as the real image of the scene and to overlay it thereon, a projection system is provided. This system comprises an image display element 16, for example, a screen, located at the object focal point of an optical system 18. The image displayed on the screen is thus collimated to infinity by optical system 18. The user does not have to make any effort of accommodation, which limits his/her visual fatigue.

The projection system is placed perpendicularly to the axis between the scene and the observer so that the beam originating from optical system 18 reaches beam splitter 10 perpendicularly to this axis. The beam originating from optical system 18 thus reaches beam splitter 10 with a 45° angle relative to its surface.

Beam splitter 10 combines the image of scene 14 and the image originating from projection system 16-18, whereby observer 12 visualizes an image comprising the projected image overlaid on the image of scene 14.

To visualize the image projected by projection system 16-18, the observer's eye should be placed in the area of reflection of the beam originating from optical system 18 on splitter 10. An important constraint to be respected is to take into account the possible motions of the user's head in front of the projector, and thus to provide the largest possible beam at the exit of optical system 18. In other words, an optical system 18 having a large exit pupil, for example in the range from a few centimeters to a few tens of centimeters, should be provided, so that the observer's head motions do not imply a loss of the projected information.

Another constraint of head-up systems is to provide a relatively compact device. Indeed, significant bulk constraints bear on these devices, particularly when they are used in plane cockpits or in the interior of vehicles of limited volume. To limit the bulk of head-up displays, devices having a decreased focal distance should thus be provided.

It is thus desired to obtain devices having a very small exit aperture, that is, the ratio of the object focal distance of the system to the diameter of the exit pupil of the device. The complexity of an optical system is known to depend on the exit aperture thereof. More particularly, the smaller the aperture of a device, the more complex the device. The more complex the optical system, the larger the number of optical elements that it contains, particularly to limit the different geometric aberrations. This increase in the number of elementary optical elements increases the volume and the cost of the complete device, which is not desired.

It is further necessary to provide devices having a low power consumption.

SUMMARY

An object of an embodiment of the present invention is to provide a compact head-up display having an exit pupil of significant size.

Another object of an embodiment of the present invention is to provide such a device having a decreased power consumption.

Thus, an embodiment of the present invention provides a head-up display comprising an assembly of sub-screens (defining together an image to be displayed, each sub-screen being associated with an optical sub-system, the sub-screens being placed in the object focal plane of the optical sub-systems, the sub-screens being defined at the surface of a substrate and being separate, each sub-screen having an extension smaller than that of the associated optical sub-system, the positions and the dimensions of the sub-screens being defined according to the length of the optical path and to a maximum authorized motion amplitude in a plane perpendicular to the optical axis and located at a distance equal to the length of the optical path, so that the image projected by the sub-screen assembly can be seen on the entire authorized motion amplitude.

According to an embodiment of the present invention, the positions and the dimensions of the sub-screens are further defined according to the mean distance between a person's two eyes.

According to an embodiment of the present invention, the optical sub-systems are regularly distributed in a plane perpendicular to the main optical axis of the display.

According to an embodiment of the present invention, along a first direction, the maximum authorized amplitude is zero and the observer's vision is monocular, the sub-screens being placed symmetrically on either side of the main optical axis of the display, each sub-screen having a length in the direction equal to fL/D, the sub-screens being distant from edge to edge by a distance equal to L, f and L respectively being the focal distance and the width of the optical sub-systems, D being the length of the optical path.

According to an embodiment of the present invention, along a first direction, the maximum authorized amplitude is non-zero, the observer's vision is monocular, and the device comprises a number Q of optical sub-systems and of sub-projectors, the sub-screens being placed symmetrically on either side of the main optical axis of the display, the centers of the sub-screens being placed at a distance from one another equal to fL/D+L, each sub-screen having a length in the direction equal to f/D(L+B), within the limit of an area having a dimension equal to QfL/D centered on the optical axis of the associated optical sub-system, f and L respectively being the focal distance and the width of the optical sub-systems, D being the length of the optical path.

According to an embodiment of the present invention, along a first direction, the maximum authorized amplitude is zero and the observer's vision is binocular, the sub-screens being placed symmetrically on either side of the main optical axis of the display, each sub-screen having a length in the direction equal to fL/D, except for the sub-screens most distant from the main optical axis which have a length equal to f/D(L+y/2), the sub-screens being distant from edge to edge by a distance equal to L, f and L respectively being the focal distance and the width of the optical sub-systems, D being the length of the optical path.

According to an embodiment of the present invention, along a first direction, the maximum authorized amplitude is equal to a mean distance between a person's two eyes and the observer's vision is binocular, the sub-screens being placed symmetrically on either side of the main optical axis of the display, each sub-screen having a length in the direction equal to fL/D, the sub-screens being distant from edge to edge by a distance equal to L, f and L respectively being the focal distance and the width of the optical sub-systems, D being the length of the optical path.

According to an embodiment of the present invention, along a first direction, the maximum authorized amplitude is greater than a mean distance between a person's two eyes, the observer's vision is binocular, and the device comprises a number Q of optical sub-systems and of sub-projectors, the sub-screens being placed symmetrically on either side of the main optical axis of the display, the centers of the sub-screens being placed at a distance from one another equal to fL/D+L, each sub-screen having a length in the direction equal to f/D(L+B−y), within the limit of an area having a dimension equal to QfL/D centered on the optical axis of the associated optical sub-system, f and L respectively being the focal distance and the width of the optical sub-systems, D being the length of the optical path.

According to an embodiment of the present invention, each sub-screen is formed of an array of organic light-emitting diode cells.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings and, further, as usual in the representation of optical systems, the various drawings are not to scale.

DETAILED DESCRIPTION

To obtain a compact head-up display, that is, comprising a projection system having a bulk smaller than a few tens of centimeters and having an exit pupil of significant size, the projection system is provided to be dissociated into a plurality of elementary projection sub-systems, each projection sub-system operating in the same way and projecting a portion of an image to be displayed overlaid on a real image.

Figure 2:
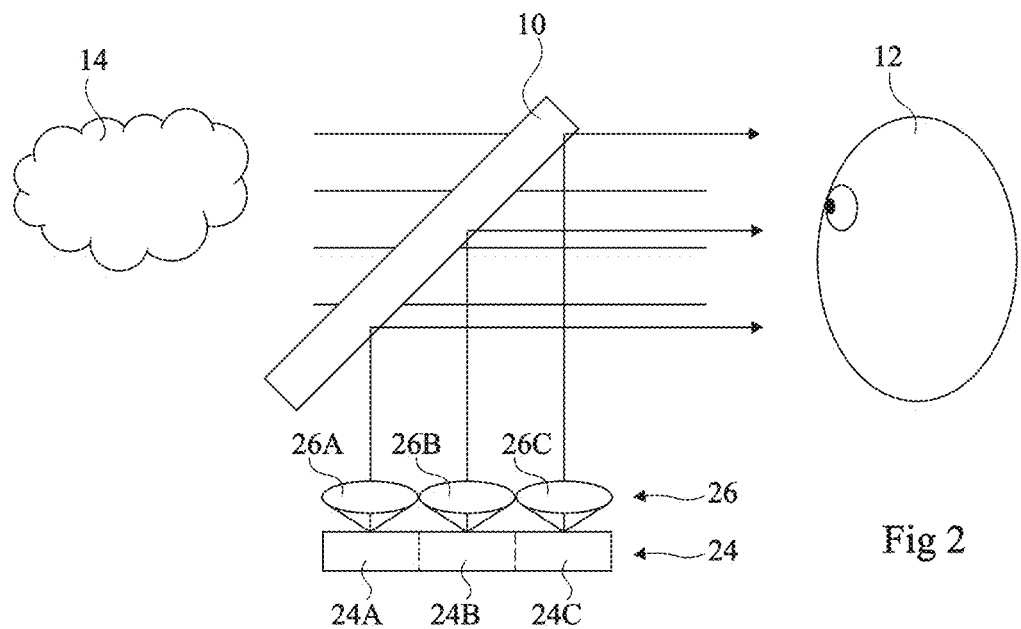
FIG. 2 illustrates the operating principle of a head-up display according to an embodiment of the present invention.

FIG. 2 shows a head-up display according to an embodiment.

In FIG. 2, the device comprises a beam splitter 10 which is placed between observer 12 and a scene to be observed 14. The surface of beam splitter 10 forms an angle, for example, 45°, with the axis between the scene and the observer, and does not disturb the arrival of rays from the scene to the observer. It should be noted that the beam splitter may be replaced with an interference filter carrying out the same function as a beam splitter.

A system of projection of an image to be superposed to the image of the scene is provided. It comprises an image source 24, for example, a screen, associated with an optical system 26. The projection system is here placed perpendicularly to the axis between the scene and the observer, and the beam which originates from optical system 26 reaches beam splitter 10 perpendicularly to this axis.

Beam splitter 10 combines, that is, overlays, the image of scene 14 and the projected image originating from optical system 26, whereby the observer visualizes the projected image overlaid on the image of scene 14. The system of FIG. 2 thus operates in the same way as the system of FIG. 1.

Optical system 26 comprises an assembly of identical optical sub-systems 26A, 26B, and 26C. Image source 24 is placed at a distance from optical system 26 equal to the object focal distance of each of optical sub-systems 26A to 26C.

Image source 24, for example, a screen, is divided into a plurality of sub-screens. The cross-section view of FIG. 2 shows three sub-screens 24A, 24B, and 24C. It should be noted that this number may be variable. Each sub-screen 24A, 24B, and 24C is associated with an optical sub-system 26A, 26B, 26C. Unlike what is shown, the sub-screens may be offset from the optical axes of the associated optical sub-systems, as will be seen hereafter.

The assembly formed of a sub-screen and of an optical sub-system will be called sub-projector herein. The projection system thus comprises a plurality of sub-projectors.

By forming a plurality of parallel sub-projectors, a complete device having a large total exit pupil (sum of the sizes of the exit pupils of each of the sub-projectors) may be obtained, while forming simple and compact optical sub-systems.

Indeed, each optical sub-system has a "moderate" so-called elementary aperture. The elementary aperture of an optical sub-system is defined as being the ratio of its specific focal distance to the dimension of its specific exit pupil. The parallel association of the sub-projectors thus provides an optical system having a particularly low aperture since, for a same distance between the screen and the projection optical element, a total exit pupil of significant size, equal to the sum of the exit pupils of each optical sub-system, is obtained. The optical system thus has a small aperture while being formed of simple elementary optical structures. The compactness of the complete device is thus ensured.

Screen 24 is provided so that each sub-screen 24A, 24B, 24C displays part of the information, the complete information being recombined by the observer's brain. To achieve this, the image which is desired to be projected in augmented reality is divided into blocks which are distributed on the different sub-screens.

As an example, screen 24 may be formed of an array of cells comprising organic light-emitting diodes (OLED), or even of an array of LCD or cathode sub-screens.

In an OLED screen, one or a plurality of layers of organic materials are formed between two conductive electrodes, the assembly extending over a substrate. The upper electrode is transparent or semi-transparent and is currently made of a thin silver layer having a thickness capable of being in the order of a few nanometers. When an adapted voltage is applied between the two electrodes, a light-emission phenomenon appears in the organic layer.

However, with an OLED-type screen, a problem of access to the electrodes may arise. Indeed, to obtain a good visibility of the projected information, due to the transmission weaknesses of devices capable of being placed at the output of the sub-screen, it is necessary to reach a luminance at the screen output in the order of 20,000 Cd/m2. To obtain such a luminance, it is necessary to send significant currents into the upper electrode of the OLED structure, typically in the range from a few amperes to some ten amperes. However a silver layer having a thickness of a few nanometers cannot withstand such an amperage.

It is thus desired to decrease the quantity of current to be delivered to an OLED screen, or to form a screen having a decreased surface area. It is here provided to form devices where the sub-screens are placed with respect to the optical sub-systems and are sized in optimized fashion to ensure the practical forming of the projection system of the head-up display.

Figure 1:
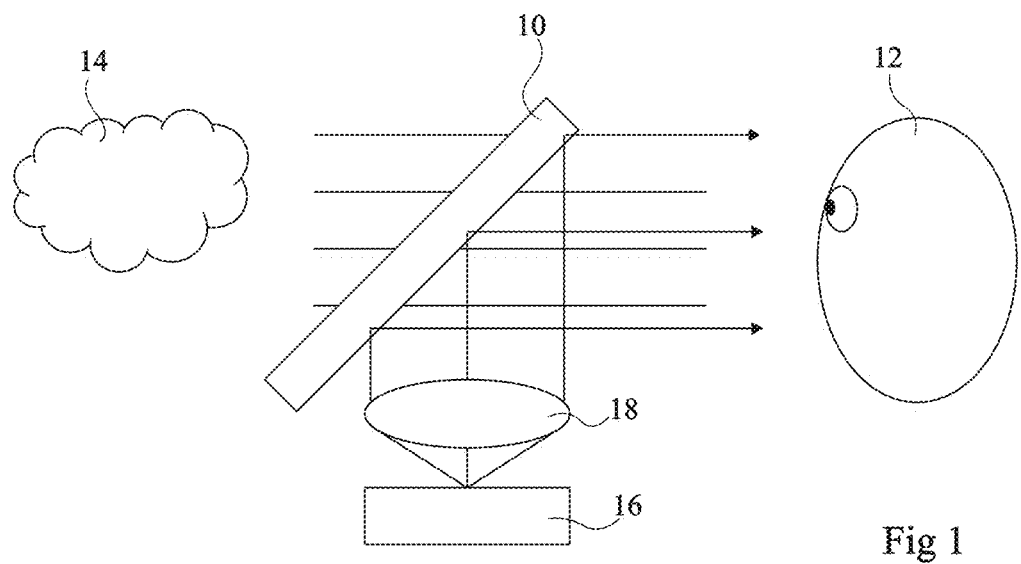
FIG. 1, previously described, illustrates the operating principle of a head-up display.
Figure 3:
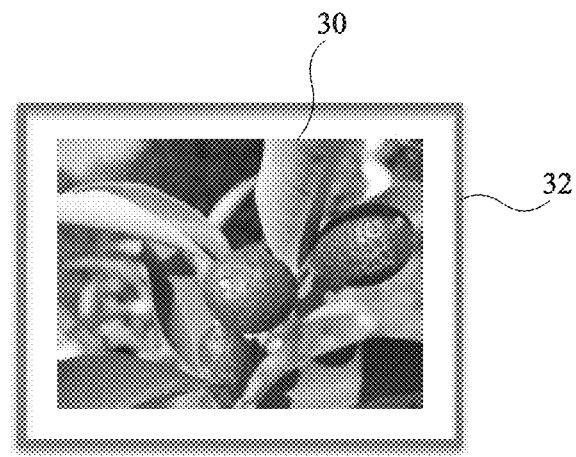
FIGS. 3 to 5 illustrate different observations made by means of the devices of FIGS. 1 and 2.
Figure 4:
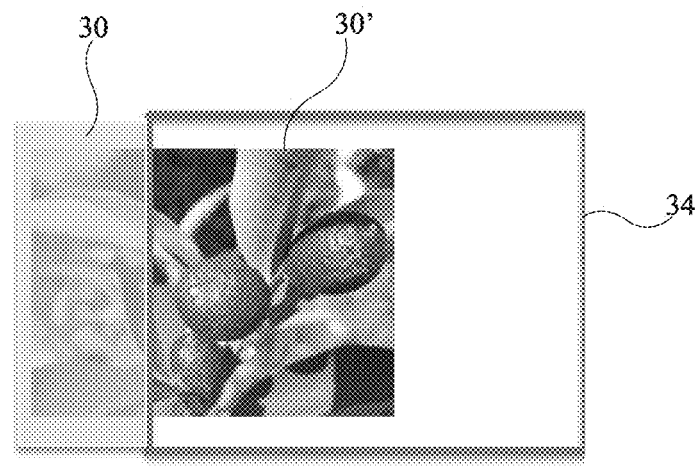
Figure 5:
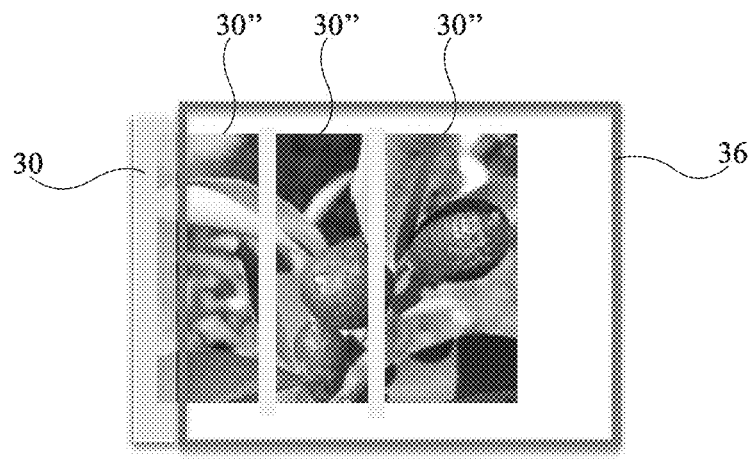

FIGS. 3 to 5 illustrate different observations made by means of the devices of FIGS. 1 and 2.

FIG. 3 illustrates an image 30 which is displayed on a screen such as screen 16 of FIG. 1 (and thus with a single-pupil optical system). A frame 32, which surrounds image 30, schematically shows the exit pupil of projection device 18 of FIG. 1. In the example of FIG. 3, exit pupil 32 is slightly wider than the image displayed by screen 30. In this case, the observer observes all the information contained in image 30, while the observer's head remains in what is called the device "eye-box" or "head motion box".

The "eye-box" is defined as being the space where the observer can move his/her head while receiving the entire projected information. In other words, as long as the observer's head remains within the eye box, he/she receives all the projected information.

FIG. 4 illustrates the vision of the information by an observer, in the case where the head-up display comprises a single-pupil optical system (case of FIG. 1), when the observer's head comes out of the eye box. In this case, exit pupil 34 (portion seen by the observer) is shifted with respect to image 30, which implies that only a portion 30' of image 30 is seen by the observer.

FIG. 5 illustrates the vision of the information by an observer, in the case where the head-up display has a multi-pupil optical system (FIG. 2), when the observer's head comes out of the eye box. In this case, the exit pupil 36 seen by the observer is shifted with respect to image 30, which implies that only a portion 30" of image 30 is accessible by the observer. Further, due to the multi-pupil structure of FIG. 2, portion 30" is seen in fragmented fashion. Indeed, in the case of a multi-pupil optical system, the image being projected by an assembly of sub-projectors, each sub-projector has its own eye box. Thus, when the observer comes out of the general eye box of the device, he/she also comes out of the eye box of each of the sub-projectors, which causes a fragmentation of the image seen by the observer. As a result, the final image seen by the observer is formed of a set of vertical strips 30" (in the case of a lateral displacement of the observer's head) of portions of image 30.

Thus, the positioning and the size of the sub-screens of a head-up display having a multi-pupil optical system should be adapted according to a predefined desired eye box. Different cases will be described hereafter, starting from an eye box of zero size (only one position of the observer ensures the reception of the entire information), the projected image filling the entire surface of the exit pupil.

Figure 6:
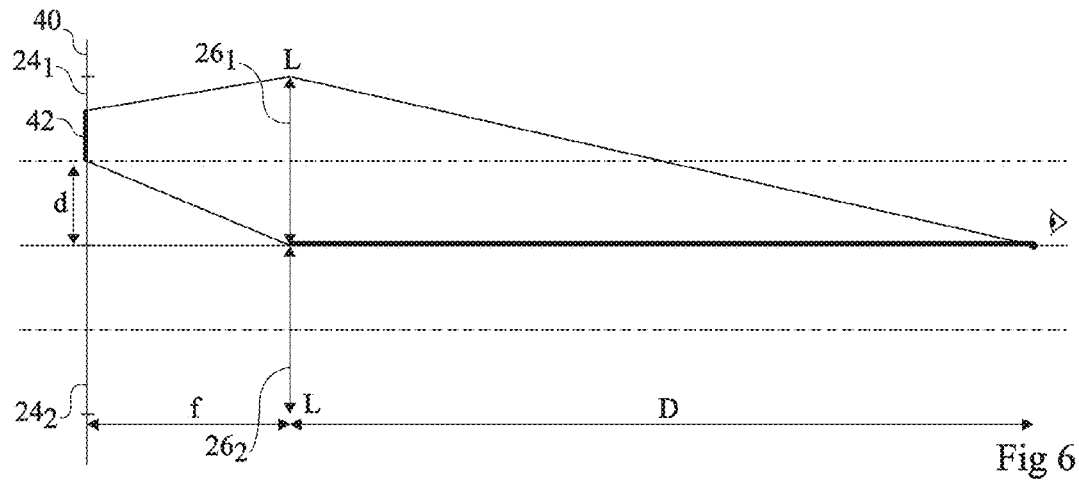
FIGS. 6 to 8 illustrate optical structures enabling to determine geometric rules for the design of an improved head-up display screen.
Figure 7:
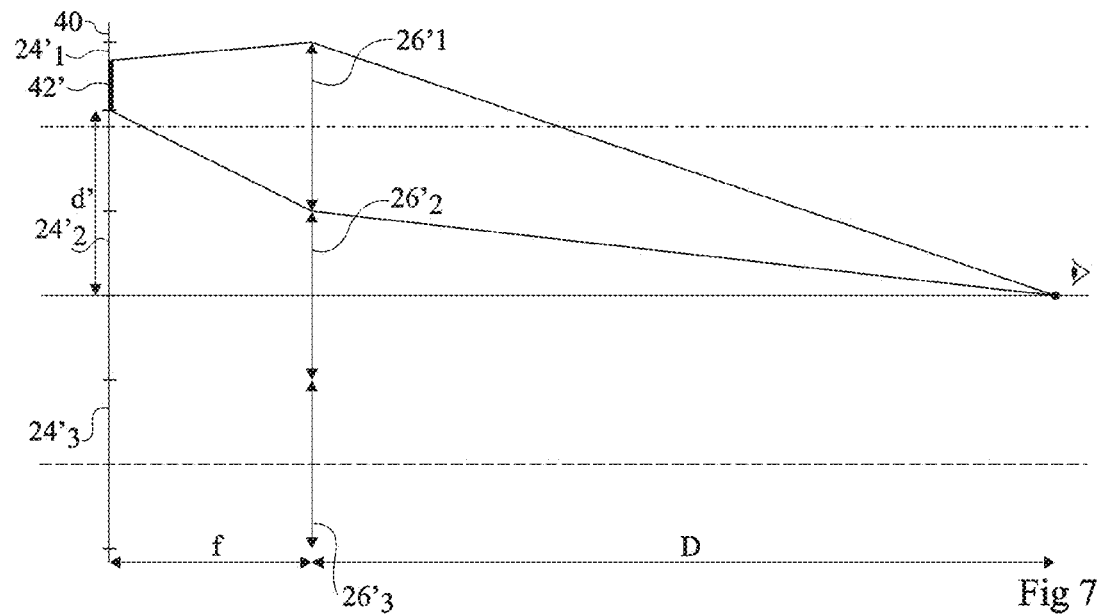
Figure 8:
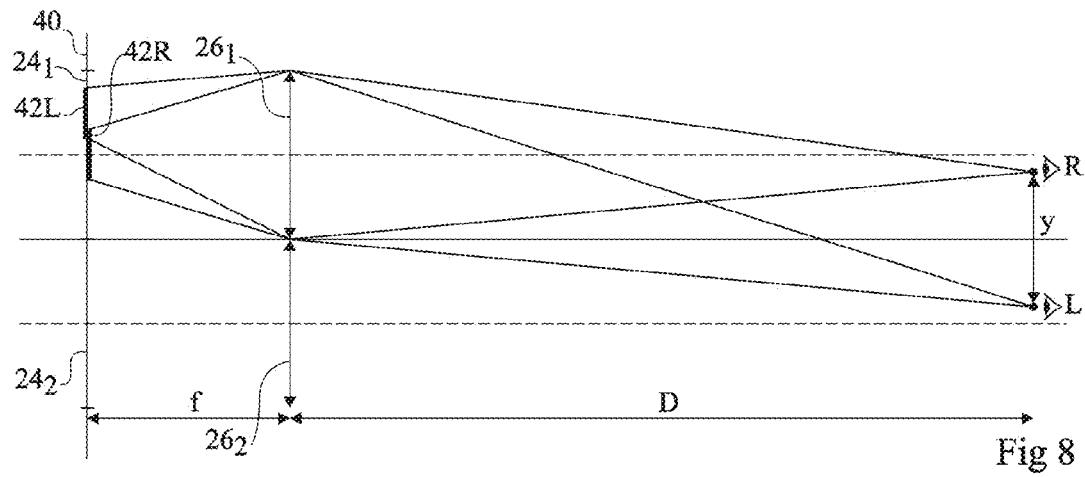

FIGS. 6 to 8 illustrate optical structures enabling to determine geometric rules for the improved placing of OLED sub-screens.

In FIG. 6, an optical system comprising two sub-screens 241 and 242 placed, on a same substrate 40, opposite two optical sub-systems 261 and 262, is considered. The sub-screens are placed at the object focal plane of the optical sub-system (the distance separating the optical sub-systems and the sub-screens is equal to object focal distance f of the optical sub-systems). In this example, sub-screens 241 and 242 and optical sub-systems 261 and 262 extend symmetrically on either side of the main optical axis of the device.

In this drawing, the aim is to determine the surface area of each useful sub-screen when the observer closes an eye (monocular vision), that is, the portion of each sub-screen seen by the eye, if the eye is placed on the main optical axis of the device at a distance D from optical system 26. Distance D between optical sub-systems 261 and 262 and the observer is called optical path. It should be noted that, in the case of a head-up display such as that in FIG. 2, the optical path, and thus the distance D which will be considered hereafter, corresponds to the light path between optical sub-systems 261 and 262 and the observer, for example running through beam splitter 10.

As shown in FIG. 6, only a portion 42 of a sub-screen 241 is seen by the observer's eye. Thus, considering a motionless observer such as in FIG. 6 (eye box of zero size and monocular vision), only portion 42 of the sub-screen is a portion useful for the observation. The rest of the screen can thus be disconnected, or screen 241 may be reduced to portion 42 only, for a same readability of the information (by projecting the entire information onto portion 42 of screen 241). This idea is the basis of the sub-screen sizing provided herein.

Portion 42 of sub-screen 241 accessible by the eye has a dimension fL/D, L being the diameter of optical sub-system 261, the edge of portion 42 being located at a distance d=L/2 from main optical axis.

The example of FIG. 7 shows a device comprising three sub-projectors formed of three sub-screens 24'1, 24'2, and 24'3 formed on a substrate 40 associated with three optical sub-systems 26'1, 26'2, and 26'3. Substrate 40 is placed in the object focal plane of optical sub-systems 26'1, 26'2, and 26'3. Central sub-projector (24'2, 26'2) has its optical axis confounded with the main optical axis of the device and the peripheral sub-projectors extend symmetrically with respect to the main optical axis of the device. Here, portion 42' of a peripheral sub-screen accessible in monocular vision by an eye placed on the main optical axis of the device, at a distance D from optical system 26, is considered.

In this case, it is obtained that portion 42' of peripheral sub-screen 24'1 accessible to the eye has a dimension equal to fL/D, L being the diameter of optical sub-system 26'1, the edge of portion 42' being located at a distance d'=L+fL/2D from the main optical axis, L being the diameter of optical sub-systems 26'1, 26'2, 26'3.

Further, whatever the position of a sub-screen in a device comprising an even or odd number of sub-screens, the surface of this sub-screen visible by an eye (monocular vision) placed on the main optical axis of the device is equal to fL/D.

FIG. 8 shows the case of FIG. 6 with a projector comprising two sub-projectors, each formed of a sub-screen 241, 242 and of an optical sub-system 261, 262. The region of the sub-screens which is accessible by an observer in binocular vision is here considered. In the present case, in top view, the observer's two eyes R and L are placed on either side of the main optical axis of the device, at a distance y/2 from this main optical axis (y thus being the distance between the observer's two eyes).

In this case, right eye R, respectively left eye L, sees a portion 42R, respectively 42L, of sub-screen 241 having a surface area equal to fL/D, with the same reference numerals as previously. However, due to the overlaying of the regions seen by the two eyes, the useful surface area of sub-screen 241, that is, the surface area of screen 24 which is seen at least by an eye of the user, has a width equal to fL/D+fy/2D.

It is here provided to limit the size of the screens to the useful size, that is, that really seen by the observer. The device power consumption can thus be decreased.

To define the useful surface of each of the sub-screens in operation, account should also be taken of the fact that the observer's head is likely to move, according to a maximum amplitude which is predefined. It should be noted that, vertically, an observer's head is less subject to motions and the vision is considered as being monocular. However, the following teachings apply to an authorized vertical motion of the head as well as to a lateral motion.

Hereafter, the maximum accepted head motion amplitude (equal to the size of the eye box in a first direction) will be called B. Rules of positioning of the sub-screens are thus defined so that, if the observer's head moves in a direction by a distance smaller than or equal to B/2, or in an opposite direction by a distance smaller than or equal to B/2, the vision of the information given by the sub-screen assembly is always complete, that is, each pixel of each sub-screen is seen by at least one of the observer's two eyes.

As will be seen hereafter, the rules of sizing and positioning of each of the sub-screens vary according to whether a zero or non-zero authorized motion amplitude B is desired, and to whether it is placed in binocular or monocular vision (for example, binocular vision in a horizontal direction, monocular in a vertical direction). In particular, the inventor has shown that the reasoning leading to size the sub-screens in a direction where the vision is monocular with a non-zero eye box size also applies to the case where the vision is binocular with an eye box B having a value greater than the distance between the observer's two eyes y.

Figure 9:
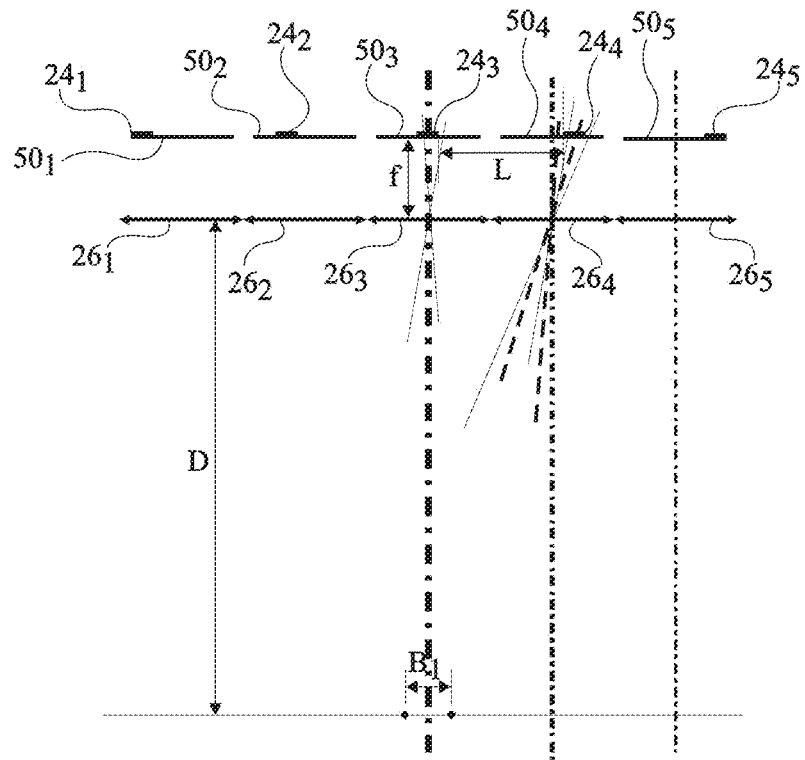
FIGS. 9 and 10 illustrate the distribution of sub-screens according to an embodiment of the present invention.
Figure 10:
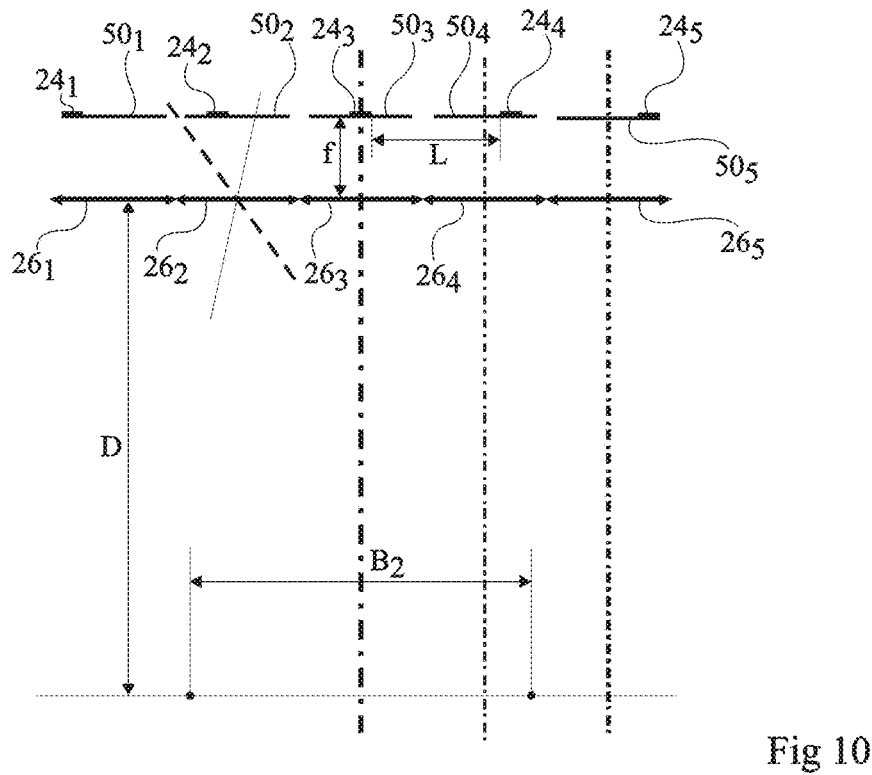

FIGS. 9 and 10 illustrate rules of positioning and sizing of sub-screens on a substrate according to an embodiment.

In these two drawings, a device comprising a number Q=5 of sub-screens 241 to 245 placed opposite five optical sub-systems 261 to 265 is provided.

In these drawings, sub-screens 241 to 245 are placed in the object focal plane of optical sub-systems 261 to 265 so that, in monocular vision, the restored image fills the entire exit pupil. Thus, in this case, the eye box has a zero dimension B (the smallest motion of the observer's head implies a loss of information). A simple calculation enables to obtain for the sub-screens to have a length in the plane of the drawings equal to fL/D and to be separated by a distance equal to the size of optical sub-systems L.

If a non-zero eye box size (thus allowing the user to move in the plane of the drawings without losing the projected information) is desired, the portion of each sub-screen visible from any eye position decreases. Thus, in order for the information on the screen to be fully received by the observer whatever his/her position, the size of each of the sub-screens may be decreased. It may also be provided to offset the sub-screens from the optical axis, or to bring them closer, according to the desired amplitude B (the decrease in the sub-screen size having a lower limit).

In the case of FIGS. 9 and 10, the sub-screens are more or less offset from the optical axis of the associated optical sub-system, according to their distance from the main optical axis of the projection system. These drawings show, as an illustration, regions 501 to 505 which are placed in the object focal plane of optical sub-systems 261 to 265 and which are centered on the optical axis of optical sub-systems 261 to 265. Each region 501 to 505 has a length equal to QfL/D, in the present case 5fL/D. It can be seen in this case that each sub-screen 241 to 245 is placed opposite a portion of region 501 to 505 corresponding to its rank, that is, the sub-screens located at the ends of the device are placed at the ends of regions 501 to 505 on either side of the device. Further, the illustration of regions 501 to 505 enables to show the image portion to be displayed by the corresponding sub-screen: peripheral sub-screens thus display a peripheral portion of the image.

In FIG. 9, an eye box, still in monocular vision at a distance D from the projection device, having a relatively low dimension equal to B1, is desired to be obtained. In this drawing, full lines delimit the focal plane area visible when the eye moves to the left in the drawing (by a distance B1/2) and dotted lines delimit the area of the focal plane visible when the eye moves to the right in the drawing (by a distance B1/2).

If a full image is desired to be see whatever the eye position in the eye box, the sub-screen should be positioned and sized to correspond to the overlapping range of the visible regions at the two ends of the eye box. However, to avoid the fragmentation phenomena discussed in relation with FIG. 5, the sub-screens should be enlarged by a distance fB/2D on either side of the sub-screen.

In FIG. 10, an eye box, still in monocular vision at a distance D from the projection device, having a relatively large dimension equal to B2, is provided. In this drawing, the full line delimits the limit of the focal plane visible when the eye moves to the left in the drawing (by a distance B2/2) and the dotted lines delimit the limit of the focal plane visible when the eye moves to the right in the drawing (by a distance B2/2).

In the case of the eye box of dimension B2, if the size of the sub-screens on each side of fB/2D is desired to be increased, it can be seen that, for one of the sides, it is not necessary to enlarge the sub-screen so much, the portion of sub-screen 24i protruding from the corresponding region 50i being useless. Thus, the peripheral sub-screens (in the present case, sub-screens 241 and 245) should only be enlarged in one direction.

It should be noted that, in a case where the vision is considered as being monocular with a non-zero eye box size, in the case where the vision is considered as being binocular with an eye box greater than y, each sub-screen has a dimension greater than fL/D. The image to be overlaid on the real image is in these two cases distributed on portions of each of the sub-screens having dimensions equal to fL/D. The information displayed on the rest of the sub-screens is redundant with the neighboring sub-screens, which provides the desired eye box dimensions.

FIGS. 9 and 10 provide the following sizing and positioning rules. It is chosen to form an array of Q×Q' sub-projectors, where Q and Q' may be even or odd. In the two directions of the projector, the sub-projectors are arranged symmetrically with respect to the main axis of the projector.

In monocular vision, for example, in the observer's vertical direction, if a zero eye box size is desired (B=0), the sub-screens are placed symmetrically with respect to the main optical axis of the device, have dimensions equal to fL/D, and are distant from edge to edge by a distance L (the centers of the sub-screens are thus distant by a distance equal to L+fL/D).

If a non-zero eye box size (B 0) is desired, the sub-screens are placed symmetrically and are centered in the same way as in the case of a zero eye box size (the centers of the sub-screens are placed at a distance from each other equal to fL/D+L), but have dimensions increased by fB/2D on each side with respect to the case where B=0. Thus, the sub-screens have dimensions equal to f/D(L+B). The edge-to-edge distance of the sub-screens is then smaller than L. The enlargement of the sub-screens is performed so as not to come out of an area having a dimension equal to QfL/D centered on the optical axis of the associated optical sub-system, Q being the number of sub-projectors in the considered direction.

In binocular vision, for example, in the observer's horizontal direction, if a zero eye box size is desired (B=0), the sub-screens have dimensions equal to fL/D and are distant from edge to edge by a distance L. Thus, the centers of the sub-screens are distant by a distance equal to L+fL/D. The peripheral sub-screens have a dimension equal to (L+y/2)f/D, y being the distance between a person's two eyes. It should be noted that in literature, the mean distance ymoy between a person's two eyes is between 60 and 70 mm, typically in the order of ymoy=65 mm. Thus, in practice, y=ymoy may be selected.

If an eye box equal to distance y between the observer's eyes is desired, all sub-screens have dimensions equal to fL/D and are distant from edge to edge by a distance L. Thus, the centers of the sub-screens are thus distant by a distance equal to L+fL/D.

If an eye box greater than distance y between the observer's eyes is desired, the sub-screens are centered in the same way as hereabove (the centers of the sub-screens are placed at a distance from one another equal to fL/D+L but increase by (B y)f/2D on both sides). The sub-screens thus have a dimension equal to (L+B−y)f/D. The edge-to-edge distance of the sub-screens is thus smaller than L. The enlargement of the sub-screens occurs so as not to come out of an area having a dimension QfL/D centered on the optical axis of the associated optical sub-system, Q being the number of sub-projectors in the considered direction.

Advantageously, the forming of screens formed of sub-screens having their dimensions and positioning defined as hereabove thus enables to decrease the device power consumption, since only useful portions of a screen, or only small screens, are powered. Further, the sub-screen distributions provided hereabove may directly correspond to the practical forming of upper OLED screen electrodes, which may be powered by conductive tracks (not shown) having sizes adapted to the transmission of a power supply current of strong amperage.

Specific embodiments of the present invention have been described. Various alterations and modifications will occur to those skilled in the art. In particular, it should be noted that the present invention has been discussed herein with sub-screens for example formed of OLEDs, but it should be understood that the invention also applies to projection systems where the screens are formed of elements different from OLEDs, as long as the dimensions of each of the sub-screens provided hereabove are respected.

Further, various embodiments with different variations have been described hereabove. It should be noted that those skilled in the art may combine various elements of these various embodiments and variations without showing any inventive step.

The invention claimed is:

1. A head-up display comprising an assembly of sub-screens defining together an image to be displayed, each sub-screen being associated with an optical sub-system, the sub-screens being placed in the object focal plane of the optical sub-systems, the sub-screens being defined at the surface of a substrate and being separate, each sub-screen having an extension smaller than that of the associated optical sub-system, the positions and the dimensions of the sub-screens being defined according to the length of the optical path and to a maximum authorized motion amplitude in a plane perpendicular to the optical axis and located at a distance equal to the length of the optical path, so that the image projected by the sub-screen assembly can be seen on the entire authorized motion amplitude.

2. The display of claim 1, wherein the positions and the dimensions of the sub-screens are further defined according to the mean distance between a person's two eyes.

3. The display of claim 1, wherein the optical sub-systems are regularly distributed in a plane perpendicular to the main optical axis of the display.

4. The display of claim 2, wherein, along a first direction, the maximum authorized amplitude is zero and the observer's vision is monocular, the sub-screens being placed symmetrically on either side of the main optical axis of the display, each sub-screen having a length in the direction equal to fL/D, the sub-screens being distant from edge to edge by a distance equal to L, f and L respectively being the focal distance and the width of the optical sub-systems, D being the length of the optical path.

5. The display of claim 2, wherein, along a first direction, said maximum authorized amplitude is non-zero, the observer's vision is monocular, and the device comprises a number Q of optical sub-systems and of sub-projectors, the sub-screens being placed symmetrically on either side of the main optical axis of the display, the centers of the sub-screens being placed at a distance from one another equal to fL/D+L, each sub-screen having a length in said direction equal to f/D(L+B), within the limit of an area having a dimension equal to QfL/D centered on the optical axis of the associated optical sub-system, f and L respectively being the focal distance and the width of the optical sub-systems, D being the length of the optical path.

6. The display of claim 2, wherein, along a first direction, said maximum authorized amplitude is zero and the observer's vision is binocular, the sub-screens being placed symmetrically on either side of the main optical axis of the display, each sub-screen having a length in said direction equal to fL/D, except for the sub-screens most distant from the main optical axis which have a length equal to f/D(L+y/2), the sub-screens being distant from edge to edge by a distance equal to L, f and L respectively being the focal distance and the width of the optical sub-systems, D being the length of the optical path.

7. The display of claim 2, wherein, along a first direction, said maximum authorized amplitude is equal to a mean distance between a person's two eyes and the observer's vision is binocular, the sub-screens being placed symmetrically on either side of the main optical axis of the display, each sub-screen having a length in said direction equal to $fL/D$, the sub-screens being distant from edge to edge by a distance equal to L, f and L respectively being the focal distance and the width of the optical sub-systems, D being the length of the optical path.

8. The display of claim 2, wherein, along a first direction, said maximum authorized amplitude is greater than a mean distance between a person's two eyes, the observer's vision is binocular, and the device comprises a number Q of optical sub-systems and of sub-projectors, the sub-screens being placed symmetrically on either side of the main optical axis of the display, the centers of the sub-screens being placed at a distance from one another equal to $fL/D+L$, each sub-screen having a length in said direction equal to $f/D(L+B-y)$, within the limit of an area having a dimension equal to $QfL/D$ centered on the optical axis of the associated optical sub-system, f and L respectively being the focal distance and the width of the optical sub-systems, D being the length of the optical path.

9. The display of claim 1, wherein each sub-screen is formed of an array of organic light-emitting diode cells.

10. The display of claim 3, wherein, along a first direction, the maximum authorized amplitude is zero and the observer's vision is monocular, the sub-screens being placed symmetrically on either side of the main optical axis of the display, each sub-screen having a length in the direction equal to $fL/D$, the sub-screens being distant from edge to edge by a distance equal to L, f and L respectively being the focal distance and the width of the optical sub-systems, D being the length of the optical path.

11. The display of claim 3, wherein, along a first direction, said maximum authorized amplitude is non-zero, the observer's vision is monocular, and the device comprises a number Q of optical sub-systems and of sub-projectors, the sub-screens being placed symmetrically on either side of the main optical axis of the display, the centers of the sub-screens being placed at a distance from one another equal to $fL/D+L$, each sub-screen having a length in said direction equal to $f/D(L+B)$, within the limit of an area having a dimension equal to $QfL/D$ centered on the optical axis of the associated optical sub-system, f and L respectively being the focal distance and the width of the optical sub-systems, D being the length of the optical path.

12. The display of claim 3, wherein, along a first direction, said maximum authorized amplitude is zero and the observer's vision is binocular, the sub-screens being placed symmetrically on either side of the main optical axis of the display, each sub-screen having a length in said direction equal to $fL/D$, except for the sub-screens most distant from the main optical axis which have a length equal to $f/D(L+y/2)$, the sub-screens being distant from edge to edge by a distance equal to L, f and L respectively being the focal distance and the width of the optical sub-systems, D being the length of the optical path.

13. The display of claim 3, wherein, along a first direction, said maximum authorized amplitude is equal to a mean distance between a person's two eyes and the observer's vision is binocular, the sub-screens being placed symmetrically on either side of the main optical axis of the display, each sub-screen having a length in said direction equal to $fL/D$, the sub-screens being distant from edge to edge by a distance equal to L, f and L respectively being the focal distance and the width of the optical sub-systems, D being the length of the optical path.

14. The display of claim 3, wherein, along a first direction, said maximum authorized amplitude is greater than a mean distance between a person's two eyes, the observer's vision is binocular, and the device comprises a number Q of optical sub-systems and of sub-projectors, the sub-screens being placed symmetrically on either side of the main optical axis of the display, the centers of the sub-screens being placed at a distance from one another equal to $fL/D+L$, each sub-screen having a length in said direction equal to $f/D(L+B-y)$, within the limit of an area having a dimension equal to $QfL/D$ centered on the optical axis of the associated optical sub-system, f and L respectively being the focal distance and the width of the optical sub-systems, D being the length of the optical path.

15. The display of claim 2, wherein each sub-screen is formed of an array of organic light-emitting diode cells.

16. The display of claim 3, wherein each sub-screen is formed of an array of organic light-emitting diode cells.

17. The display of claim 7, wherein each sub-screen is formed of an array of organic light-emitting diode cells.

18. The display of claim 8, wherein each sub-screen is formed of an array of organic light-emitting diode cells.

19. The display of claim 13, wherein each sub-screen is formed of an array of organic light-emitting diode cells.

20. The display of claim 14, wherein each sub-screen is formed of an array of organic light-emitting diode cells.

* * * * *